United States Patent
Rider

(10) Patent No.: US 7,545,747 B2
(45) Date of Patent: *Jun. 9, 2009

(54) METHOD, SYSTEM AND PROGRAM PRODUCT FOR ACTIVELY MANAGING CENTRAL QUEUE BUFFER ALLOCATION USING A BACKPRESSURE MECHANISM

(75) Inventor: Scot H. Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/014,141

(22) Filed: Jan. 15, 2008

(65) Prior Publication Data

US 2008/0112314 A1 May 15, 2008

Related U.S. Application Data

(63) Continuation of application No. 10/822,795, filed on Apr. 9, 2004, now Pat. No. 7,349,334.

(51) Int. Cl.
*G01R 31/08* (2006.01)

(52) U.S. Cl. ..................... 370/234; 370/235
(58) Field of Classification Search ......... 370/229–240, 370/411–419
See application file for complete search history.

(56) References Cited

U.S. PATENT DOCUMENTS

| | | | |
|---|---|---|---|
| 4,445,176 | A | 4/1984 | Burk et al. |
| 5,594,889 | A | 1/1997 | Colgate et al. |
| 5,615,392 | A | 3/1997 | Harrison et al. |
| 5,712,976 | A | 1/1998 | Falcon, Jr. et al. |
| 5,784,698 | A | 7/1998 | Brady et al. |
| 5,838,994 | A | 11/1998 | Valizadeh |
| 5,920,732 | A | 7/1999 | Riddle |
| 6,044,418 | A | 3/2000 | Muller |
| 6,046,817 | A | 4/2000 | Brown et al. |
| 6,098,123 | A | 8/2000 | Olnowich |

(Continued)

*Primary Examiner*—Wing F Chan
*Assistant Examiner*—Eunsook Choi
(74) *Attorney, Agent, or Firm*—Joseph Biela, Esq.; Kevin P. Radigan, Esq.; Heslin Rothenberg Farley & Mesiti P.C.

(57) ABSTRACT

Method, system and program product are provided for packet flow control for a switching node of a data transfer network. The method includes actively managing space allocations in a central queue of a switching node allotted to the ports of the switching node based on the amount of unused space currently available in the central queue and an amount of currently-vacant storage space in a storage device of a port. In a further aspect, the method includes separately tracking unallocated space and vacated allocated space, which had been used to buffer packets received by the ports but were vacated since a previous management update due to a packet being removed from the central queue. Each port is offered vacated space that is currently allocated to that port and a quantity of the currently unallocated space in the central queue to distribute to one or more virtual lanes of the port.

17 Claims, 7 Drawing Sheets

U.S. PATENT DOCUMENTS

| | | |
|---|---|---|
| 6,219,728 B1 | 4/2001 | Yin |
| 6,453,404 B1 | 9/2002 | Bereznyi et al. |
| 6,539,024 B1 | 3/2003 | Janoska et al. |
| 6,553,483 B1 | 4/2003 | Coffman et al. |
| 6,715,008 B2 | 3/2004 | Shimizu |
| 6,760,795 B2 | 7/2004 | Goudie et al. |
| 6,947,433 B2 | 9/2005 | Carvey |
| 6,973,555 B2 * | 12/2005 | Fujiwara et al. ............ 711/170 |
| 2002/0078317 A1 | 6/2002 | Yasoshima |
| 2003/0026267 A1 | 2/2003 | Oberman et al. |

* cited by examiner

US 7,545,747 B2

METHOD, SYSTEM AND PROGRAM PRODUCT FOR ACTIVELY MANAGING CENTRAL QUEUE BUFFER ALLOCATION USING A BACKPRESSURE MECHANISM

CROSS-REFERENCE TO RELATED APPLICATIONS

This application is a continuation of U.S. patent application Ser. No. 10/822,795, filed Apr. 9, 2004, and entitled "Method, System and Program Product for Actively Managing Central Queue Buffer Allocation Using a Backpressure Mechanism," which is hereby incorporated herein by reference in its entirety. Further, this application contains subject matter which is related to the subject matter of U.S. patent application Ser. No. 10/822,794, filed Apr. 9, 2004 and published Oct. 13, 2005 as U.S. Patent Publication No. US 2005-0226145 A1, entitled "Method, System and Program Product for Actively Managing Central Queue Buffer Allocation", by Garmire, et al., which is assigned to the same assignee as this application, and which is hereby incorporated herein by reference in its entirety.

TECHNICAL FIELD

This invention relates in general to packet flow control through a data transfer network switching node, and more particularly, to techniques for facilitating packet flow by actively managing allocation of space in a node's central queue allotted to switching node ports based on the amount of unused space currently available in the central queue.

BACKGROUND OF THE INVENTION

A conventional switching node for a data communications (or transfer) network utilizes dedicated buffers at its input ports or at its output ports. These dedicated buffers couple the ports to the switching logic that directs data packets received by the input ports to the appropriate output ports and facilitate flow control of the data packets transmitted through the data communications network. Common data traffic patterns in a data transfer network often result in widely disparate volumes of traffic at the ports of network switching nodes, and these disparate traffic volumes typically vary over time. Consequently, the use of buffers which are dedicated to respective ports in the network switching nodes is often not well-matched to the data traffic characteristics. Input port blocking can occur in a busy port because its buffer fills to capacity while the data packet at the front of the buffer's queue waits to be switched to a busy output port. Meanwhile, the buffers of other ports that are only receiving a small amount of traffic have free space available that cannot be utilized.

SUMMARY OF THE INVENTION

The shortcomings of the prior art are overcome and additional advantages are provided through the provision of a method of packet flow control for a switching node of a data transfer network. The method includes actively managing space allocations in a central queue of a switching node allotted to the ports of the switching node. The active management of the space allocations in the central queue is based on the amount of unused space currently available in the central queue and an amount of currently-vacant storage space in a storage device of a port.

A further aspect of the technique of managing space allocations in the central queue includes separately tracking unused space that is currently unallocated, and unused space that is allocated to ports of the switching node but has been vacated due to a packet being transferred from the central queue to an output port. Each port is offered vacated space that is currently allocated to it and a quantity of the currently unallocated space in the central queue (e.g., approximately periodically). Yet another aspect of the active management of space allocations in the central queue to the ports comprises dynamically allocating the quantity of unused space offered to a port to one or more virtual lanes of the port.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
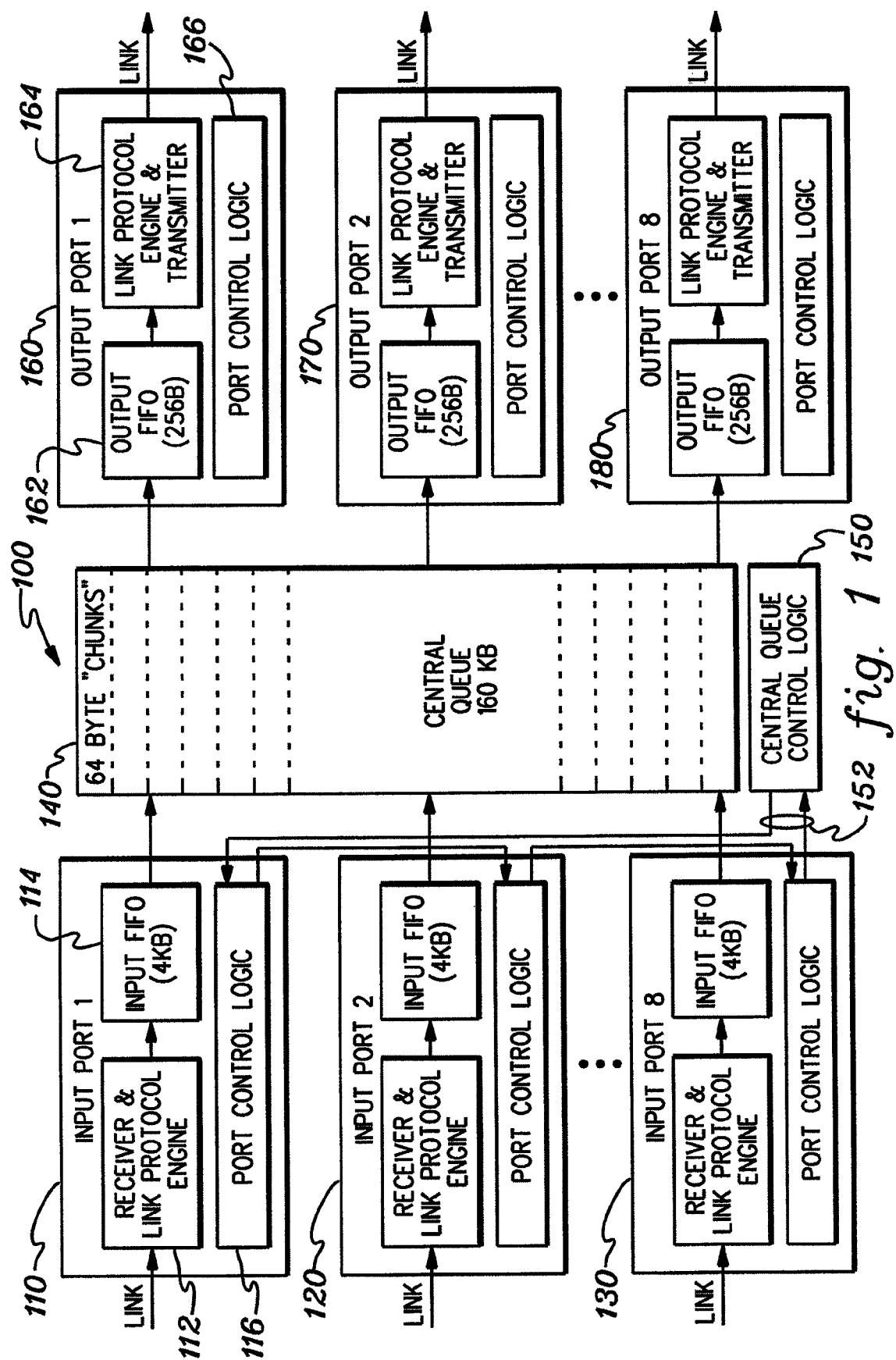
FIG. 1 illustrates one embodiment of a switching node of a data transfer network employing packet flow control, in accordance with an aspect of the present invention.

Generally stated, described herein is a packet flow control technique for a switching node of a data transfer network. In one aspect, the technique actively and dynamically manages space allocations in a central queue of a switching node that are given to the ports of the switching node to be used for packet buffering. The active and dynamic management of the space allocations in the central queue is based on the amount of currently unused space available in the central queue. In another aspect, the technique includes allotting the space allocation given to a port among one or more virtual lanes of the port. Space in the central queue is allocated in n-byte blocks (a.k.a. "chunks"). Each block is represented by one credit. Based on the amount of central queue space that is allotted to a port's virtual lanes, the port can grant a corresponding number of credits to the transmitting end of the link for flow control purposes.

One embodiment of a switching node of a data transfer network employing packet flow control, in accordance with an aspect of the present invention, is described below with reference to FIG. 1. This embodiment of a switching node comprises multiple input ports (110, 120, and 130) coupled to a central queue 140 and multiple output ports (160, 170, and 180) also coupled to central queue 140. The switching node embodiment illustrated in FIG. 1 also includes central queue control logic 150. Central queue control logic 150 is coupled to central queue 140, input ports 110, 120, and 130, and output ports 160, 170, and 180.

Input port 110 interfaces to a communications link via a receiver and link protocol engine unit 112. Receiver and link protocol engine unit 112 is coupled to a first-in, first-out (FIFO) register 114 and port control logic 116. FIFO register 114 of input port 110 is coupled to central queue 140. Input ports 120 and 130 are similarly configured.

FIFO register 162 of output port 160 interfaces to central queue 140 and transmitter and link protocol engine unit 164 of output port 160. Transmitter and link protocol engine unit 164, in turn, is coupled to port control logic 166 and a communications link. Output ports 170 and 180 are similarly configured.

The following discussion summarizes the flow of a data packet through switching node embodiment 100 illustrated in FIG. 1 and the interaction of various of its constituent parts. By way of example, the flow of a data packet through switching node 100 where the data packet is received by input port 110 and is transmitted eventually via output port 160 is assumed. After the data packet is received by receiver and link protocol engine unit 112, it is placed in FIFO register 114. From FIFO register 114, the packet is buffered in central queue 140. Port control logic 116 decrements the space available to the virtual lane to which the packet is assigned by an amount equal to the size of the packet. A port determines a packet's virtual lane from an attribute of the packet (e.g. the packet's service level field) and a service-level-to-virtual-lane mapping table.

When the destination output port is not busy transmitting another packet, the packet buffered in central queue 140, can be transferred to FIFO register 162 of output port 160. The data packet is read from FIFO register 162 for transmission over a link by transmitter and link protocol engine unit 164. The transfer of the received packet from central queue 140 to FIFO register 162 in preparation for transmission causes space which is allocated to a virtual lane of a port to be vacated. This vacated space is offered back to the virtual lane of the port from which the packet was received by central queue control logic 150 in order to maintain an allocation of space in central queue 140 for all of the multiple ports.

In addition, the space allocations in central queue 140 for the ports of the switching node are actively managed based on the amount of unused space available in central queue 140. The unused space in central queue 140 includes space that is not currently allocated to any of the switching node's ports and vacated allocated space, i.e. space that is currently allocated to a virtual lane of a port and had been used to buffer a received packet, but has been vacated as the result of the packet being transferred to a FIFO register of an output port. Vacated allocated space can also result from an input port discarding a received packet.

Figure 2:
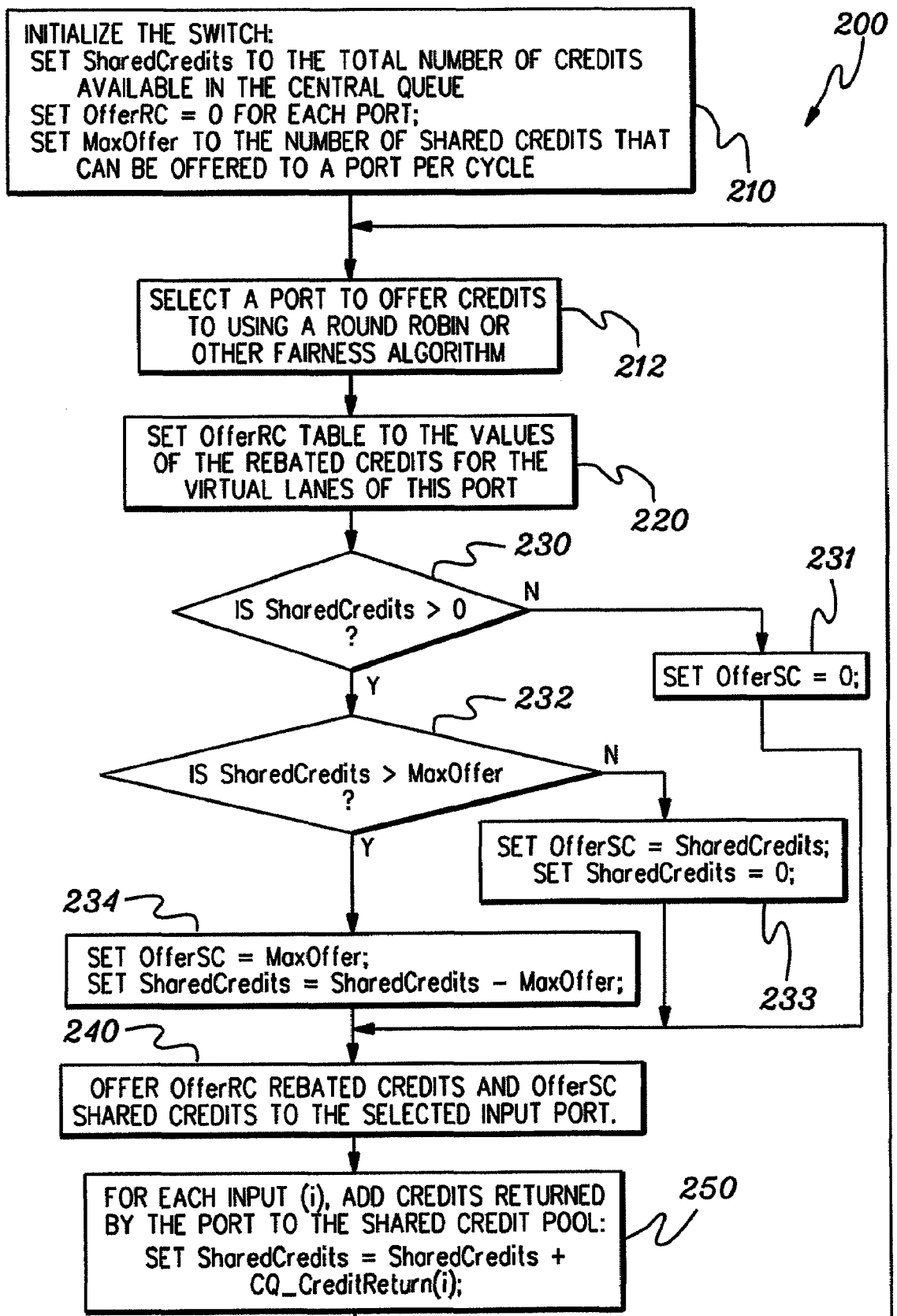
FIG. 2 is a flowchart of one aspect of a technique for managing central queue buffer allocations to the ports of a switching node of a data transfer network, in accordance with an aspect of the present invention.

In one embodiment of a technique for actively managing space allocations in central queue 140 for the ports of the switching node, the management is distributed among central queue control logic 150 and the port control logic of multiple ports. FIG. 2 is a flowchart 200 of one embodiment of central queue control logic for allocating space in the central queue to the ports of the switching node embodiment shown in FIG. 1, in accordance with an aspect of the present invention. With reference to FIG. 2, several parameters utilized in the management of space allocations are initialized 210 to begin the process. These include: SharedCredits, which is the amount of unallocated space available in the central queue measured in units of credits, OfferRC, which is the amount of vacated allocated space measured in units of credits, and MaxOffer, which is the maximum amount of unallocated space available in the central queue that central queue control logic 150 of FIG. 1 can offer to a port per management interval.

Following initialization of parameters, active central queue space allocation management begins with selecting a port to which to offer credits, i.e. an amount of unused space, using a defined rule 212. One example of such a defined rule is selecting each port in turn approximately periodically so that central queue space is fairly allocated among the ports of the switching node. The central queue control logic separately tracks the amount of vacated allocated space for the virtual lanes of each of the ports and the amount of unallocated space currently available in the central queue.

As indicated in the flowchart of FIG. 2, these two categories of unused space in the central queue are allocated differently. The counter table OfferRC comprises a counter for each virtual lane. The counter for each virtual lane of the selected port is set equal to an amount of space in the central queue corresponding to all vacated allocated space assigned to the associated virtual lane 220. The counter variable SharedCredits is used to track the amount of unallocated space currently available in the central queue. If a test of the counter variable SharedCredits indicates that there is unallocated space in the central queue 230, an amount of unallocated space in the central queue, up to an amount defined by the parameter MaxOffer, is allocated to the selected port by setting the variable OfferSC equal to the smaller of the following two amounts of space: MaxOffer and SharedCredits 232, 233, and 234. The amount of space allocated to the selected port is also deducted from the amount of unallocated space currently available in the central queue 233 and 234. The amount of unused space represented by the values of the counter table OfferRC and variable Offer SC is offered to the selected port 240. The number of credits returned by each port, representing an amount of previously allocated central queue space, is added to the pool of unallocated space in the central queue 250 before the space management process of the central queue control logic returns to the beginning of the process loop 212.

As discussed above, two categories of unused space in the central queue—vacated allocated space and unallocated space—are tracked separately and allocated differently. The reasons for this are as follows. On one hand, vacated allocated space is offered by the central queue control logic to the virtual lane of the port to which it is currently allocated to ensure that each virtual lane receives a designated minimum amount of buffer space, thereby preventing those virtual lanes from suffering blocking due to heavy traffic and blocking problems experienced in other virtual lanes. On the other hand, offered shared credits are offered on a fair basis to all ports in order to dynamically provide additional buffer space in the shared central queue to various ports and their respective virtual lanes as required to serve time-varying traffic to the ports of the switching node.

Figure 3A:
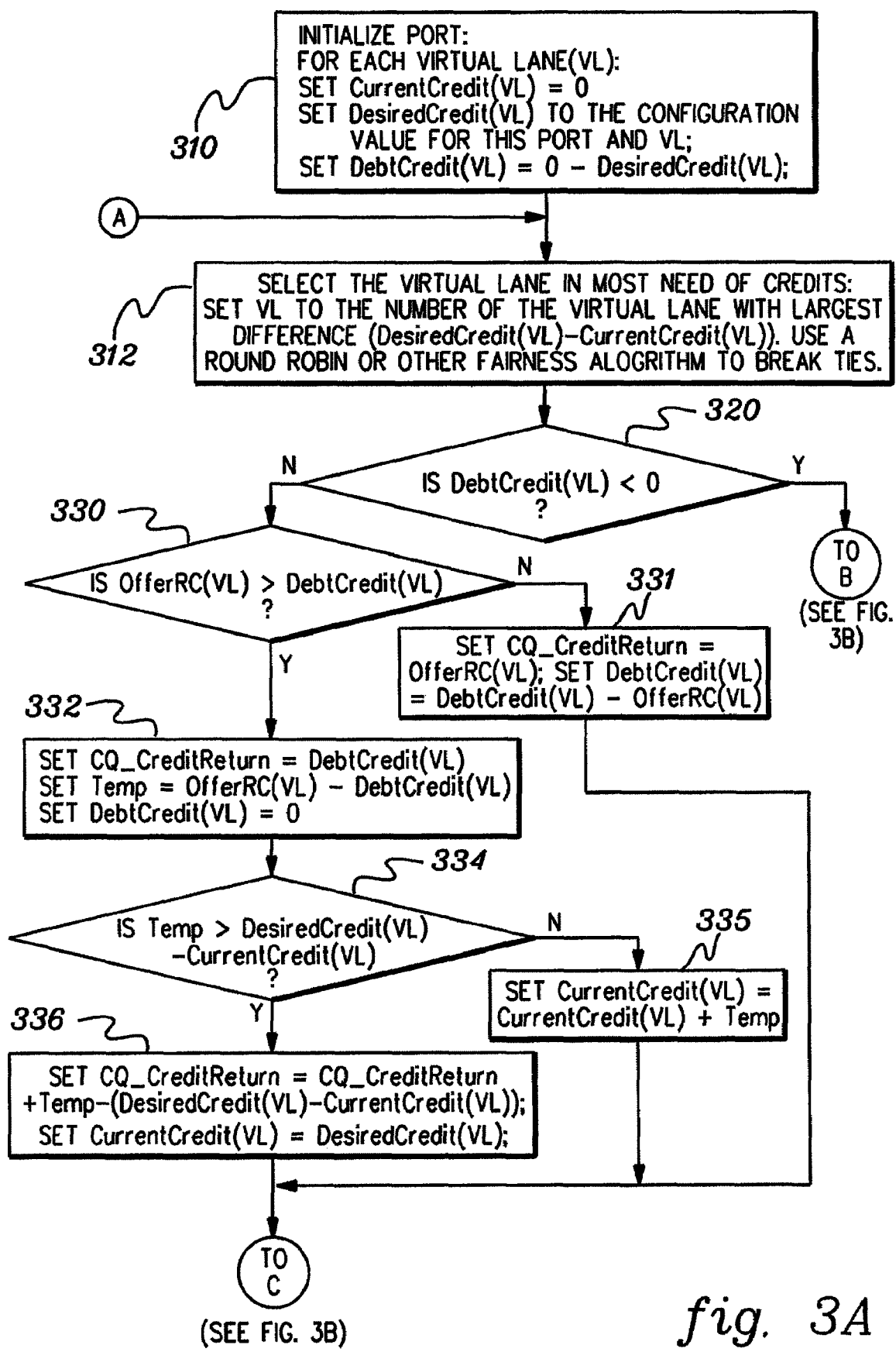
FIGS. 3a and 3b illustrate a flowchart of another aspect of a technique for managing central queue buffer allocations to the ports of a switching node, in accordance with an aspect of the present invention, wherein space in the central queue assigned to a port is further allocated to virtual lanes of the port.

Further aspects of a technique for actively managing space allocations in the central queue of a switching node for the node's ports, in accordance with an aspect of the present invention, are described below with reference to the flowchart shown in FIGS. 3a and 3b. This flowchart illustrates one embodiment of a technique for allocating space in the central queue (which has been offered to a port), to the virtual lanes of the input port of the switching node embodiment shown in FIG. 1. With reference to FIG. 3a, several variables utilized in the allocation of space offered to a port are initialized 310 to begin the process. These include the following variables for each virtual lane: CurrentCredit(VL), which counts the amount of space currently available (unused) in the allocation to that virtual lane; DesiredCredit(VL), which represents the target amount of unused buffer space in the central queue that the port control logic will attempt to maintain for the virtual lane, working in coordination with the central queue control logic; and DebtCredit(VL), which represents the amount of buffer space in the central queue that has been borrowed by the virtual lane from the pool of unallocated space available in the central queue (but not yet returned). Initially, DebtCredit (VL) is set equal to −DesiredCredit(VL). The negative value of DebtCredit(VL) is an indication that this virtual lane is owed space in the central queue.

After initialization, the repeating loop in the space allocation technique for the virtual lanes begins with selecting the virtual lane (VL) of the port that is currently in the greatest need of buffer space in the central queue 312. In one example, the VL most in need of space in the central queue is determined to be the virtual lane having the largest difference between DesiredCredit(VL) and CurrentCredit(VL). In the flowchart shown in FIGS. 3a and 3b, buffer space in the central queue is measured and tracked in units called "credits".

Once a virtual lane has been selected 312, the remaining steps in the repeating loop of the virtual-lane space allocation technique involve tracking various measures of space allocation and usage as well as space allocation decisions that are directed to the selected VL. First, DebtCredit(VL) is tested to determine whether the selected virtual lane is owed any space in the central queue 320. In one embodiment, a virtual lane is owed credits when the value of DebtCredit is negative. If the selected VL is owed any credits, OfferRC(VL) is compared to (DesiredCredit(VL)−CurrentCredit(VL)) 321 where (DesiredCredit(VL)−CurrentCredit(VL)) is the difference between the target amount of unused buffer space in the central queue for virtual lane VL and the current amount of unused space in the allocation to that virtual lane. If OfferRC (VL) is less than or equal to ((DesiredCredit(VL)−CurrentCredit(VL)), all OfferRC credits offered to the port for the selected VL are allocated to that virtual lane 322. Alternatively, if OfferRC(VL) is greater than ((DesiredCredit(VL)−CurrentCredit(VL)), the port control logic keeps only enough of the OfferRC(VL) credits for the selected virtual lane to increase the current amount of unused space in the selected virtual lane's central queue allocation (CurrentCredit(VL)) to the target amount ((DesiredCredit(VL)) 323. In this case, the remaining OfferRC(VL) credits, i.e. OfferRC(VL)−(DesiredCredit(VL)−CurrentCredit(VL)), are returned to the pool of unallocated space in the central queue by setting the variable CQCreditReturn equal to the number of remaining OfferRC(VL) credits 323. As discussed previously with reference to FIG. 2, OfferRC credits offered to a port for a particular virtual lane by central queue control logic correspond to the amount of vacated allocated space in the central queue that is currently assigned to that virtual lane of the port.

If the selected virtual lane is not owed any credits, the allocation processing of port control logic goes on to determine how much of the vacated allocated space in the central queue offered to the port for the selected virtual lane (i.e. the OfferRC credits for the selected virtual lane), to allocate to the selected VL and how the determined allocation to the selected VL is utilized. In order to simplify the foregoing discussion, vacated allocated space in the central queue offered to a port for a virtual lane will be referred to as rebated space or rebated credits, and OfferRC(VL) will designate the counter in table OfferRC for the selected virtual lane. If the rebated space exceeds the current central-queue space debt of the selected virtual lane 330, the rebated credits are first used to eliminate the VL's debt by returning the number of credits, corresponding to the current balance of central-queue space borrowed, to the pool of unallocated space in the central queue. In one example, the variable CQ_CreditReturn is set to DebtCredit (VL) to effectuate satisfaction of the current space debt 332. Also, DebtCredit(VL) set equal to zero 332 to indicate that the virtual lane no longer has a debt.

After satisfying the selected VL's space debt, the logic determines whether the number of remaining rebated credits, i.e. those not used to satisfy the space debt, exceed the number required to raise the amount of currently available (unused) space in the VL's allocation to the desired amount 334. If so, the number of remaining rebated credits required to increase the amount of space available in the VL's allocation in the central queue to the desired amount is allocated to the selected virtual lane 336. The number of remaining rebated credits exceeding the amount required is returned to the pool of unallocated space in the central queue by adding the excess credits to CQ_CreditReturn 336. If test 334 is negative, all offered rebated credits are allocated to the selected virtual lane 335. In either case, the count kept in variable CurrentCredit(VL) is incremented as appropriate to reflect the increase in currently available space in the VL's allocation (334 and 335).

If, however, the rebated space does not exceed the current central-queue space debt of the selected virtual lane 330, all of the rebated credits offered to the port are returned to the pool of unallocated space in the central queue in order to reduce the selected virtual lane's space debt 331. In one example, this space debt reduction is effectuated by setting the variable CQ_CreditReturn to OfferRC(VL) and deducting OfferRC(VL) credits from the space debt counter variable DebtCredit(VL).

After allocating any rebated space that has been offered to the port for the selected virtual lane, the management of space allocations proceeds with allocating the quantity of space from the pool of unallocated space in the central queue that has been offered to the port. This quantity of offered space is indicated by the value of the variable OfferSC. To simplify the following discussion, the quantity of space from the pool of unallocated space in the central queue that has been offered to the port will also be referred to as offered shared credits. The allocation of offered shared credits among the port's virtual lanes begins with determining whether any shared credits have been offered to the port 340. If not, processing returns to the beginning of the loop to select the virtual lane in the greatest need of credits currently (312, FIG. 3a). If a quantity of space from the pool of unallocated space in the central queue that has been offered to the port, OfferSC is tested to determine whether the offered shared credits exceed the number of credits required to increase the selected virtual lane's available space in its central queue allocation to its target level 342. If it does not, all offered shared credits are allocated to the selected virtual lane's space allocation in the central queue 344; the selected VL's debt is increased by the number of offered shared credits 344; and processing proceeds to the selection of the virtual lane currently having the greatest need for space in the central queue 312 in FIG. 3a.

Alternatively, if the offered shared credits exceed the number of credits required to increase the selected virtual lane's available space in its central queue allocation to its target level, the number of offered shared credits required to raise the virtual lane's available space in the central queue to the target amount is allocated to the selected virtual lane's space allocation in the central queue 346; the selected VL's debt is increased by the number of offered shared credits so allocated to the VL 346; the excess offered shared credits beyond what is needed to raise the VL's available credits in the central queue to the target amount are returned to the pool of unallocated space available in the central queue 346; and processing proceeds to the selection of the virtual lane currently having the greatest need for space in the central queue 312 in FIG. 3a.

It should be noted that because DesiredCredit(VL) is a factor in the test to determine which virtual lane has the greatest need for credits 312 and also influences how many of the offered shared credits are allocated to the selected virtual lane (342, 344, and 346) for each pass through the repeating loop in the technique for allocating space in the central queue offered to a port of a switching node, it is possible to dynamically change the space allocations in the central queue for the virtual lanes of a port without having to reinitialize the switching node by simply changing the value of the DesiredCredit(VL) parameter.

Figure 4:
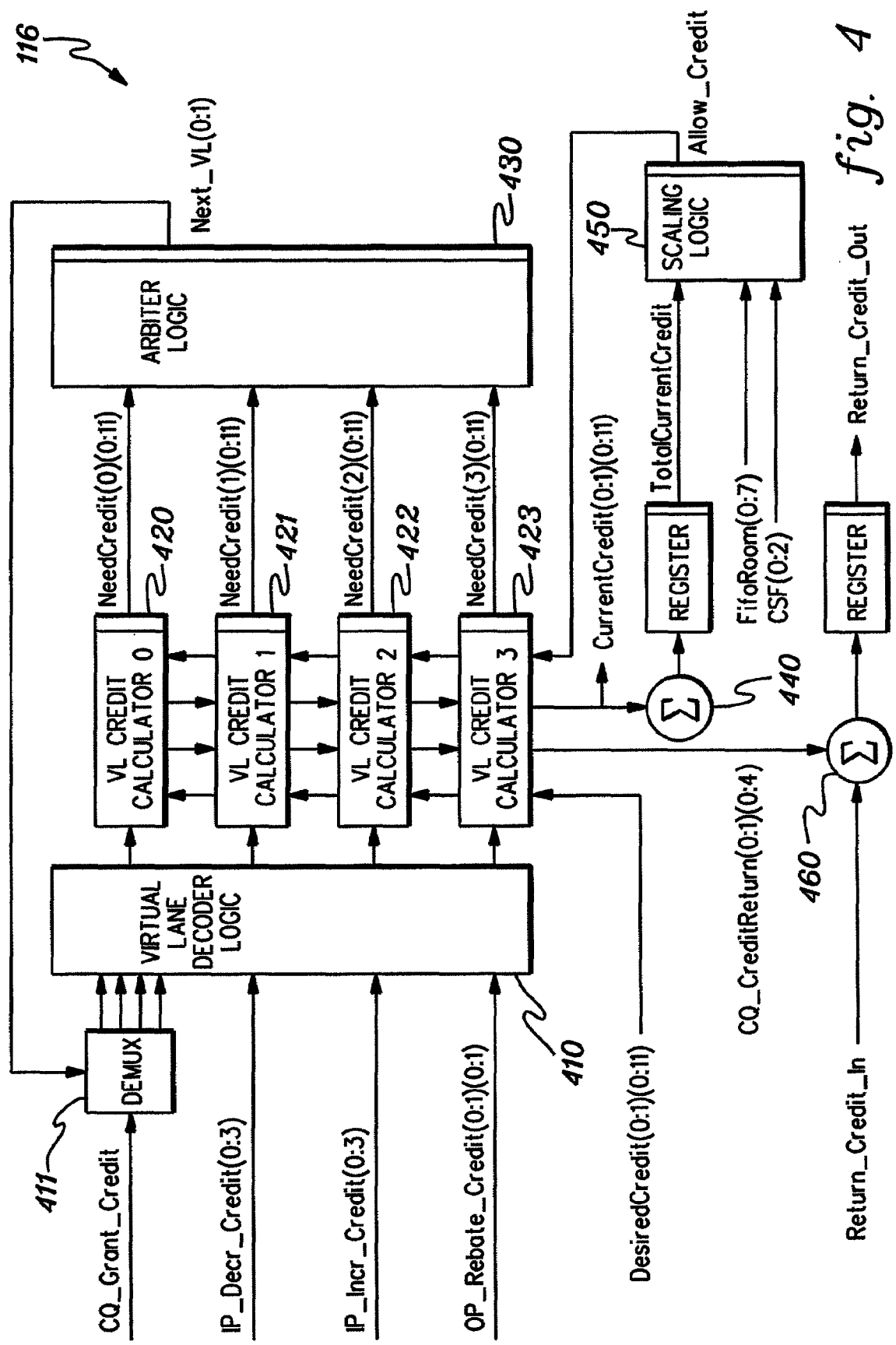
FIG. 4 illustrates one embodiment of port control logic for the switching node embodiment of FIG. 1, in accordance with an aspect of the present invention.

One embodiment of port control logic 116 (also referred to as port credit manager) for the switching node embodiment of FIG. 1, in accordance with an aspect of the present invention, is described below with reference to FIG. 4. By way of example, the embodiment of FIG. 4 partitions the port's resources into four virtual lanes, which are designated by indices 0, 1, 2, and 3. Port control logic 116 receives several signals that it uses to manage a port's space allocation in central queue 140 of FIG. 1 and allocate space assigned to the port among multiple virtual lanes. These input signals include DesiredCredit(0:1)(0:11), CQ_Grant_Credit, IP_Decr_Credit(0:3), OP_Rebate_Credit(0:1)(0:1), and IP_Incr_Credit(0:3). In most cases, the first set of indices references the VL, and the second set is the magnitude. The signal DesiredCredit designates the target quantity of available (i.e. unused) buffer space to maintain in the central queue for each virtual lane. CQ_Grant_Credit is a quantity of unallocated space in the central queue that is currently being offered to the port (i.e., OfferSC from FIG. 2). The group of signals IP_Decr_Credit(0:3) indicates an amount of space used to buffer packets received by the port for each of the virtual lanes since the previous update, which, therefore, must be deducted from the virtual lanes' available space allocations in the central queue. OP_Rebate_Credit indicates the amount of space in the central queue that is being offered as a rebate to the port's VL (i.e., OfferRC from FIG. 2) because one or more packets previously received by the port and buffered in the central queue were transferred from the central queue to an output port since the previous update. IP_Incr_Credit indicates the amount of space in the central queue that is offered as a rebate to the port because one or more packets previously received by the input port were discarded by the port itself in accordance with the protocol employed by the data transfer network.

Signals CQ_Grant_Credit, IP_Decr_Credit(0:3), OP_Rebate_Credit(0:1)(0:1), and IP_Incr_Credit(0:3) are passed to virtual lane credit calculators 420, 421, 422, and 423 by virtual lane decoder logic 410. In particular, virtual lane decoder logic 410 passes the components of signals IP_Decr_Credit(0:3), IP_Incr_Credit(0:3), and OP_Rebate_Credit identified by indices 0, 1, 2, and 3 to the associated virtual lane credit calculators 420, 421, 422, and 423, respectively. On the other hand, signal CQ_Grant_Credit is directed by demultiplexer 411 to one of the VL credit calculators via virtual lane decoder logic 410 in response to the signal Next_VL, which is generated by arbiter logic 430. Also, the DesiredCredit signal component associated with each virtual lane is provided to the corresponding VL credit calculator, and all VL credit calculators receive the Allow_Credit signal generated by scaling logic 450. The signal Allow_Credit is a backpressure mechanism that is sent to all virtual lane calculators to prevent an overflow of a port's FIFO register and will be described in more detail below.

Virtual lane credit calculators 420, 421, 422, and 423 provide signals NeedCredit(0), NeedCredit(1), NeedCredit(2), and NeedCredit(3), respectively, to arbiter logic 430. The NeedCredit signals indicate the additional central queue space needs of the port's virtual lanes. Arbiter logic 430 will pick the virtual lane in the most need of credit (i.e., the virtual lane having largest value of NeedCredit). The virtual lane credit calculators also produce the CurrentCredit and CQ_CreditReturn signals. CurrentCredit represents the current amount of unused space available in the central queue space that is currently allocated to a virtual lane. CQ_CreditReturn represents the amount of space that is returned by a virtual lane to the pool of unallocated central-queue space. A virtual lane's CurrentCredit count is decremented by the amount of space indicated by IP_Decr_Credit by its VL credit calculator whenever a packet is received by the input port on the specified virtual lane. The values of OP_Rebate_Credit and IP_Incr_Credit for each virtual lane will be directed to their respective credit calculators to determine whether an increase in the CurrentCredit for a virtual lane is allowed, or the credits should be returned to the central queue via the Return_Credit_Out signal on the CQ_CreditReturn ring (FIG. 1, 152).

Space returned to the unallocated pool of space in the central queue (CQ_CreditReturn) is added to credits returned by other ports (Return_Credit_In) by adder logic 460. The sum (Return_Credit_Out) is placed on credit return ring 152 of FIG. 1. The CurrentCredit signals for each virtual lane are provided to the receiver & link protocol engine unit of the port, e.g. receiver & link protocol engine unit 112 of input port 110 in FIG. 1. Also, summation logic 440 computes the sum of all of the virtual lanes' CurrentCredit signals for the port to produce the TotalCurrentCredit signal, which is an input to scaling logic 450. Other inputs to scaling logic 450 include FifoRoom and CSF. The FifoRoom signal indicates the amount of unused space in the port's input FIFO 114. The CSF (Credit Scaling Factor) signal introduces an adjustment to compensate for a difference in the bandwidth to the input port and the bandwidth between the input port and central queue.

Scaling Logic 450 is an enhancement to the port control logic 116 that provides a backpressure mechanism in case the input port bandwidth exceeds the bandwidth between the input port and central queue. In one example, the credit scaling factor is calculated as follows:

$$CSF = BW_{RLPE}/(BW_{RLPE} - BW_{CQ}) \text{ where}$$

$BW_{RLPE}$ is the bandwidth to the input port, and $BW_{CQ}$ is the bandwidth from the input port to the central queue.

The scaling logic will assert the Allow_Credit signal only when the following equation is satisfied:

$$(CSF)(FifoRoom) > TotalCurrentCredit$$

where FifoRoom is the number of unused credits in an input port's input FIFO.

When Allow_Credit is not asserted, the input port will not accept any credits offered on the IP_Incr_Credit, OP_Rebate_Credit, or CQ_Grant_Credit signals in the form of CurrentCredit until the FifoRoom increases enough (i.e., the input port's input FIFO empties enough) to satisfy the above condition. If this condition is not satisfied, the credit will be used only to reduce the selected virtual lane's space debt, which is indicted by DebtCredit (VL). If DebtCredit is 0 while Allow_Credit is also zero (i.e., not asserted), and credit is returned to the port, the input port will return the returned credits to the CQ and allow its DebtCredit to go negative, effectuating a "loan" to the central queue until the input port's input FIFO can empty out.

One embodiment of the virtual lane credit calculators shown in the port control logic embodiment of FIG. 4, in accordance with an aspect of the present invention, is described with reference to FIG. 5. In this embodiment, the virtual lane credit calculator collects credit returned through IP_Incr_Credit and OP_Rebate_Credit in collection cache 553 and CQ_Grant_Credit in collection cache 552. Collection caches 552 and 553 are just adders that accumulate the number of credits returned in a small interval of time, which is equal to the time it takes for the VL credit calculator to update. The sum of credits from IP_Incr_Credit and OP_Rebate_Credit for a particular VL during the update interval is stored in OfferRC by cache 553, and the sum of credits from CQ_Grant_Credit during the update interval is stored in cache 552. Signals OfferRC, OfferSC, Allow_Credit, DesiredCredit, CurrentCredit, NeedCredit, and DebtCredit all feed arithmetic logic 590, which calculates the amount of change necessary in DebtCredit (dDebt), and CurrentCredit (dCurrent). Arithmetic logic 590 also determines how much surplus credit to return to the central queue (as indicated by the CQ CreditReturn signal).

The current value of DebtCredit is computed by adder logic 530 and subtraction logic 520 as follows. Adder logic 530 adds the change in the VL's space debt dDebt to the previous value of DebtCredit. The signal dDebt is provided by arithmetic logic 590. Then, this sum from adder logic 530 is provided as an input to subtraction logic 520. Subtraction logic 520 calculates the difference between the output of adder 530 and the signal dDesired, which is the output of subtraction logic 510 and represents the change in the target space level for the virtual lane over a management update interval. The value of DebtCredit calculated by subtraction logic 520 is provided as a feedback input to arithmetic logic 590 and adder logic 530.

The current value of CurrentCredit, the space currently available in the virtual lane's space allocation in the central queue, is computed as follows. Arithmetic logic 590 provides dCurrent, a signal which indicates the change in the available space in the VL's allocation in the central queue since the last management update, as an input to adder logic 560. The other input to adder logic 560 is the previous value of CurrentCredit. The previous value of CurrentCredit is the output of subtraction logic 570, which is fed back via a register. The output of adder logic 560 is decremented by the value of the IP_Decr_Credit signal by subtraction logic 570 to produce the CurrentCredit signal. As discussed previously, the IP_Decr_Credit signal indicates the amount of the virtual lane's central queue space allocation that has been consumed to store received packets since the last management update.

This embodiment of the virtual lane credit calculators calculates the output signal NeededCredit by providing input signal DesiredCredit and output signal CurrentCredit as inputs to subtraction logic 580. Subtraction logic 580 computes NeededCredit by calculating the difference (DesiredCredit−CurrentCredit). The output signal NeededCredit is also provided as feedback to arithmetic logic 590 via a register.

Figure 3B:
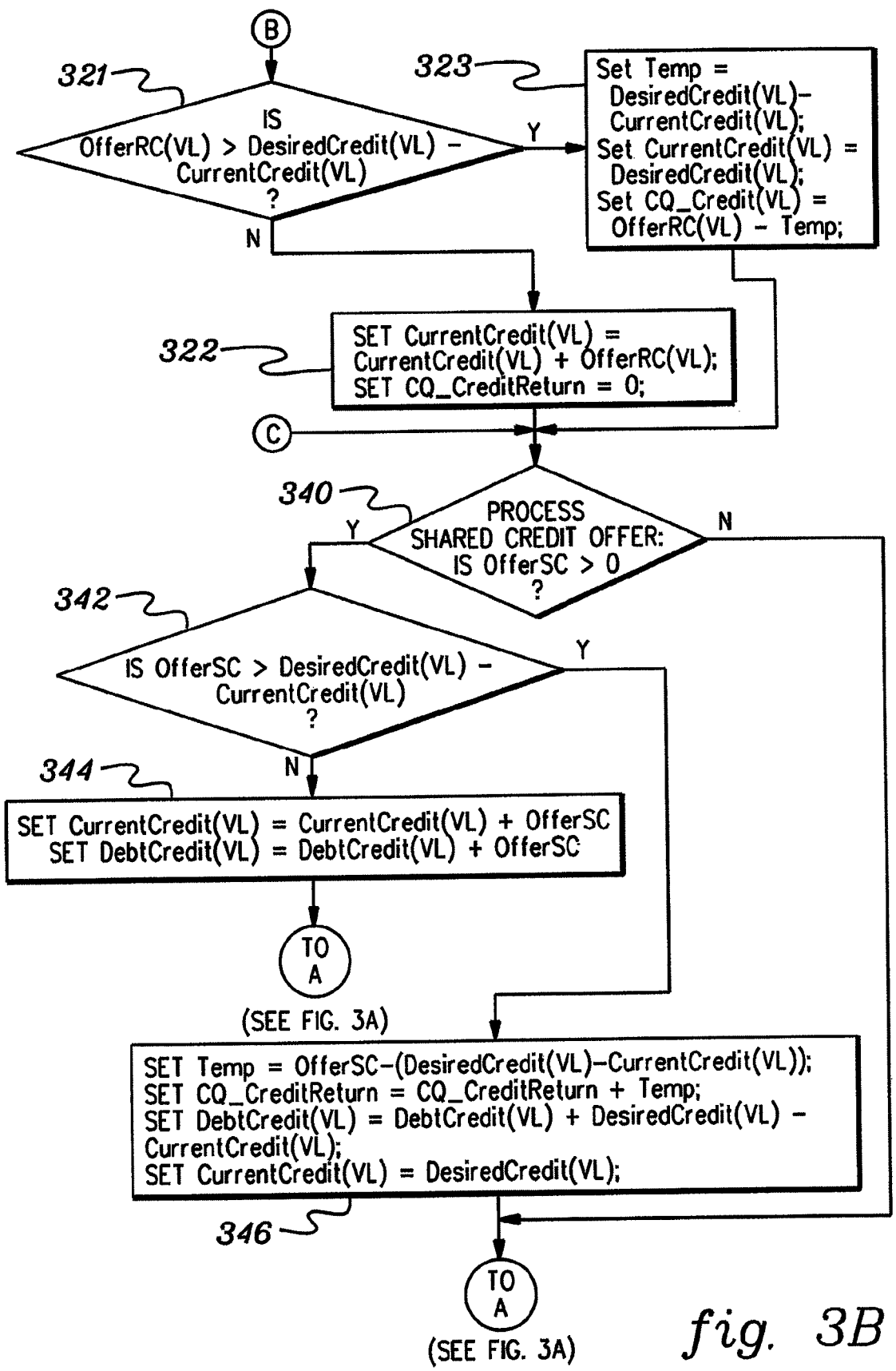
Figure 6:
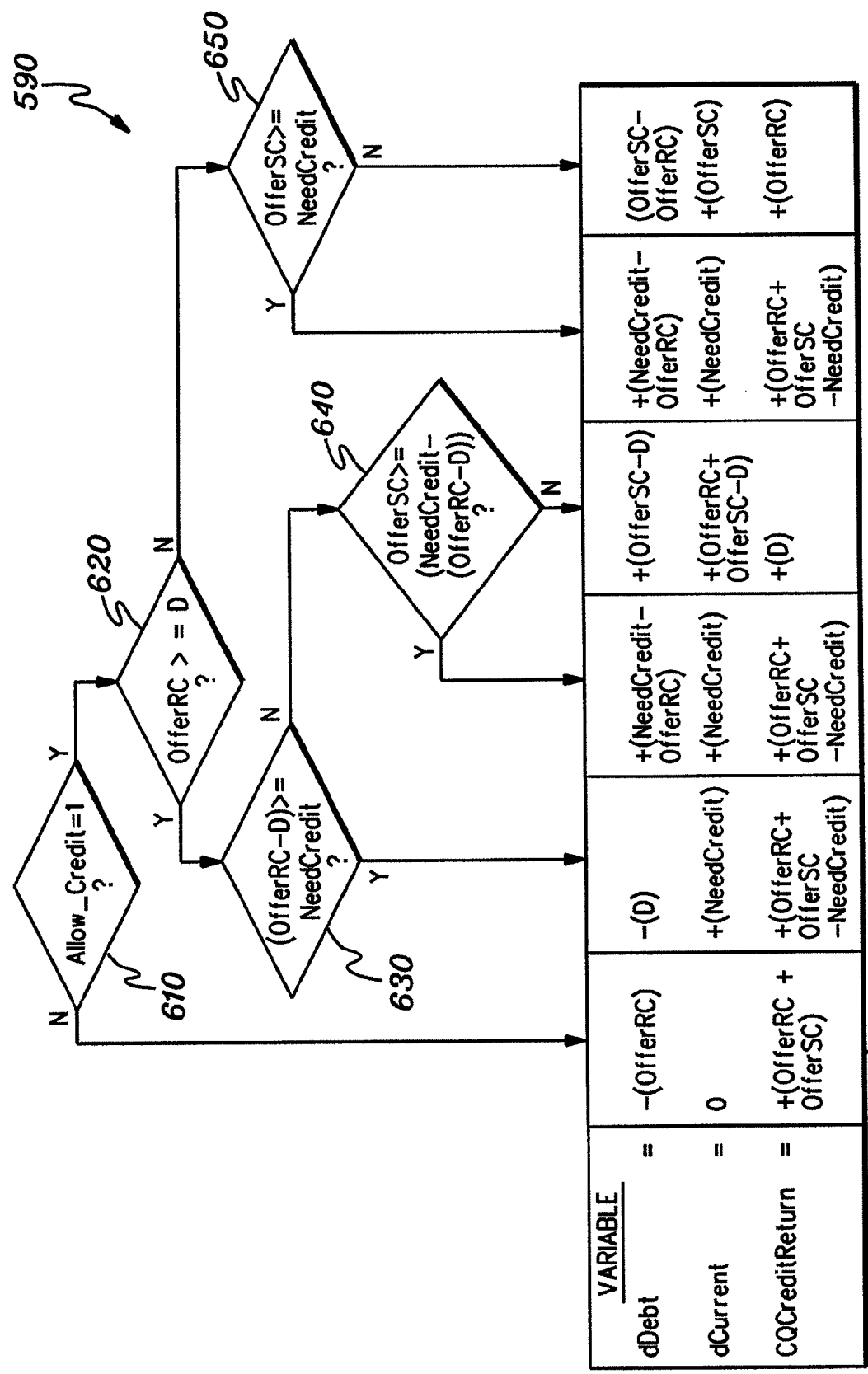
FIG. 6 illustrates a flowchart of one embodiment of the arithmetic logic of FIG. 5, in accordance with an aspect of the present invention.

In one example, arithmetic logic 590 computes the signals dDebt, dCurrent, and CQ CreditReturn in accordance with the technique for allocating space to the virtual lanes of a port described previously with reference to the flowchart illustrated in FIGS. 3a and 3b as shown in more detail in FIG. 6. The calculations described in FIG. 6 are executed in hardware where all four virtual lane credit values are manipulated in parallel.

Returning to FIG. 5, the signal dDesired represents a change in the amount of DesiredCredit for a virtual lane. If DesiredCredit is increased (allocating more space in the central queue to a VL of an input port), an immediate reduction in DebtCredit is effectuated by subtractor 520. This enables the VL to accept more reserved space from the central queue. If DesiredCredit is decreased (reducing a VL's space allocation in the central queue) an immediate increase in DebtCredit is effectuated by subtractor 520 and the virtual lane calculator will begin to return credit on CQ CreditReturn to attempt to drive the amount of space used by the VL to its current allocation of space.

The LinkState signal supplied to cache 553 is asserted when DesiredCredit is set to 0 and the virtual lane or port is disabled. It will cause an amount of credit equal to the value of the CurrentCredit signal to be asserted as both OfferRC and IP_Decr_Credit, causing the credit calculator to convert CurrentCredit into CQ CreditReturn credit and effectively returning the reserved credit of this virtual lane of the port to the central queue.

The desired amount of buffer space in the central queue for each virtual lane can be set differently based on the number of VLs being used by a port, the maximum transmission unit (MTU) size for the port, and the level of performance required. The packet flow control technique in accordance with the present invention allows the desired amount of credit to be changed on the fly while the port is in operation. Thus, the amount of buffer space that the input port tries to maintain for its virtual lanes can be raised or lowered as traffic conditions change or as ports are activated deactivated without having to reset the switch.

Figure 5:
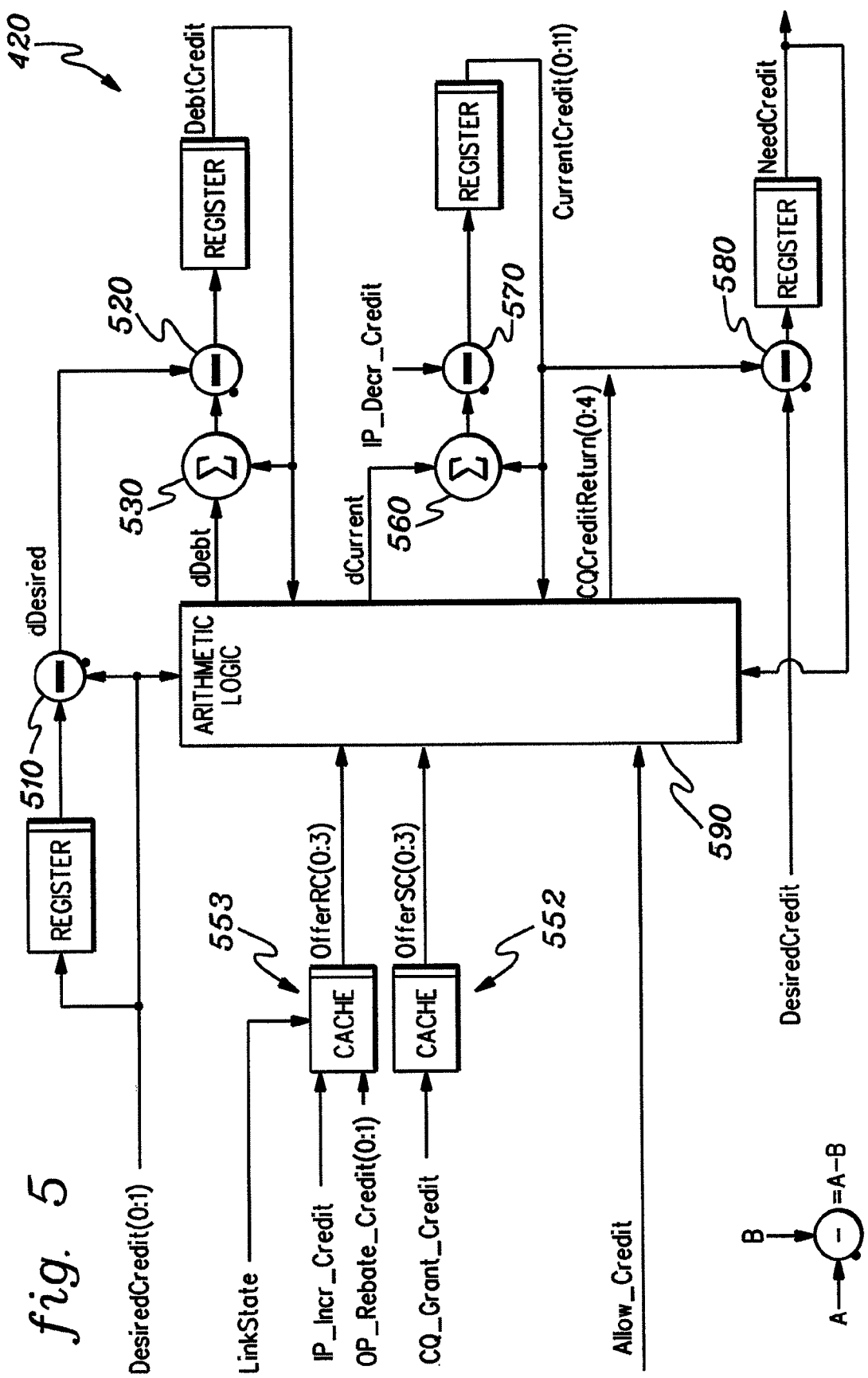
FIG. 5 illustrates one embodiment of virtual lane calculators for the port control logic embodiment of FIG. 4, in accordance with an aspect of the present invention.

FIG. 6 illustrates a flowchart of one embodiment of arithmetic logic 590 of FIG. 5, in accordance with an aspect of the present invention. Values are assigned to the variables dDebt, dCurrent, and CQCreditReturn 660 in accordance with the path taken through the decision logic comprising arithmetic logic 590. The processing begins with determining whether Allow_Credit is equal to one 610. If Allow_Credit is not equal to one, the processing proceeds to the calculation and assignment of the variable values 660. If Allow_Credit is equal to one, the signal OfferRC is compared to a threshold debt value D 620, where D is equal to DebtCredit if DebtCredit is greater than zero, and D has the value zero if DebtCredit is less than or equal to zero. If OfferRC greater than or equal to the threshold debt value D, processing continues with a comparison of the NeedCredit signal to the value (OfferRC−D) 630; alternatively, if OfferRC is less than D, the decision logic of arithmetic logic 590 determines whether OfferSC is greater or equal to NeedCredit 650. The values assigned to the variables dDebt, dCurrent, and CQCreditReturn 660 depend on the branch taken from the comparison of OfferSC and Need-Credit 650.

Following another branch of the processing of arithmetic logic 590, if NeedCredit is less than or equal to (OfferRC−D) 630, the processing is directed to the calculation and assignment of the variable values 660 as shown in FIG. 6; otherwise, the processing continues with a comparison of the input signal OfferSC to the value (NeedCredit−(Offer RC−D)) 640. From this comparison of the OfferSC signal 640, processing proceeds to the calculation and assignment of the variable values 660 in accordance with the output branch taken from the comparison as shown in FIG. 6.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A packet flow control system for a switching node of a data transfer network, said system comprising:

means for actively managing space allocations in a central queue for a plurality of ports of a switching node of a data transfer network, wherein the actively managing is based on an amount of currently unused space in the central queue; and wherein the means for actively managing includes means for determining, based on an amount of currently-vacant storage space in a storage device of a port of the plurality of ports, whether the port accepts an offered space for use by the port to buffer received data packets, the offered space comprising a quantity of the amount of currently unused space in the central queue; and wherein said means for determining further comprises:

means for multiplying the amount of currently-vacant storage space in the storage device of the port by a scaling factor, wherein the scaling factor accounts for a difference between a first bandwidth at an input of the port and a second bandwidth between the port and the central queue.

2. The system of claim 1, wherein said means for multiplying produces a scaled measure of vacant port storage space and said means for determining further comprises:

(i) means for computing a total current credit for the port, wherein the total current credit is defined as a difference between a space allocation in the central queue for the port and an amount of the space allocation currently used to buffer the received data packets;

(ii) means for comparing the total current credit to the scaled measure of vacant port storage space;

(iii) means for accepting the offered space if the scaled measure of vacant port storage space is greater than the total current credit; and (iv) means for refusing the offered space if the scaled measure of vacant port storage space is less than the total current credit.

3. The system of claim 2, wherein the scaling factor is set substantially equal to a reciprocal of a fractional portion of data that is received by the port per a unit of time that will remain in the storage device of the port for a period exceeding the unit of time due to the difference between the first bandwidth and the second bandwidth.

4. The system of claim 2, wherein said system further comprises:

means for allocating, by a port credit manager, the offered space to at least one virtual lane of the port based on a space need of the at least one virtual lane if the offered space is accepted as a result of the determining.

5. The system of claim 2, wherein:

said system further comprises means for reckoning amounts of unused space remaining in space allocations in the central queue allotted to virtual lanes of the port, wherein an amount of unused space remaining in a space allocation in the central queue allotted to a virtual lane of the port comprises an amount allotted to the virtual lane, but currently not used to store a received data packet; and said means for computing further comprises means for summing the amounts of unused space remaining in space allocations in the central queue allotted to the virtual lanes of the port.

6. The system of claim 1, wherein said means for actively managing further comprises:

means for returning the offered space back to the central queue as returned space if said determining results in a refusal of the offered space; and means for adding the returned space to the amount of currently unused space in the central queue.

7. The system of claim 6, wherein:

the returned space includes vacated allocated space in the central queue that is currently assigned to a virtual lane of the port; and said means for actively managing further comprises means for deducting, from a current space debt of the virtual lane, an amount representing the vacated allocated space included in the returned space, wherein the current space debt of the virtual lane comprises an amount of space by which a space allocation in the central queue allotted to the virtual lane exceeds a target allocation.

8. A queue manager for a switching node of a data transfer network, said queue manager comprising:

central queue control logic for a switching node for tracking an amount of currently unused space in a central queue of the switching node and offering a quantity of the unused space to a plurality of ports of the switching node; and a port credit manager for determining, based on an amount of currently-vacant storage space in a storage device of a port of the plurality of ports, whether the port accepts an offered space for use by the port to buffer received data packets, the offered space comprising the quantity of the unused space in the central queue offered by said central queue control logic and, if the offered space is accepted, allocating the offered space to at least one virtual lane of the port; and wherein the determining by the port credit manager further comprises:

multiplying the amount of currently-vacant storage space in the storage device of the port by a scaling factor, wherein the scaling factor accounts for a difference between a first bandwidth at an input of the port and a second bandwidth between the port and the central queue.

9. The queue manager of claim 8, wherein the determining by the port credit manager further comprises:

(i) computing a total current credit for the port, wherein the total current credit is defined as a difference between a space allocation in the central queue for the port and an amount of the space allocation currently used to buffer the received data packets;

(ii) comparing the total current credit to the scaled measure of vacant port storage space;

(iii) accepting the offered space if the scaled measure of vacant port storage space is greater than the total current credit; and (iv) refusing the offered space if the scaled measure of vacant port storage space is less than the total current credit.

10. The queue manager of claim 9, wherein:

the port credit manager returns the offered space back to the central queue as returned space if the determining results in a refusal of the offered space; and the central queue control logic adds the returned space to the amount of currently unused space in the central queue.

11. At least one program storage device readable by a machine, tangibly embodying at least one program of instructions executable by the machine to perform a packet flow control method for a switching node of a data transfer network, said method comprising:

actively managing space allocations in a central queue for a plurality of ports of a switching node of a data transfer network, wherein the actively managing is based on an amount of currently unused space in the central queue;

wherein the actively managing includes determining, based on an amount of currently-vacant storage space in a storage device of a port of the plurality of ports, whether the port accepts an offered space for use by the port to buffer received data packets, the offered space comprising a quantity of the amount of currently unused space in the central queue; and wherein said determining further comprises:

multiplying the amount of currently-vacant storage space in the storage device of the port by a scaling factor, wherein the scaling factor accounts for a difference between a first bandwidth at an input of the port and a second bandwidth between the port and the central queue.

12. The at least one program storage device of claim 11, wherein said multiplying produces a scaled measure of vacant port storage space and said determining further comprises:

(i) computing a total current credit for the port, wherein the total current credit is defined as a difference between a space allocation in the central queue for the port and an amount of the space allocation currently used to buffer the received data packets;

(ii) comparing the total current credit to the scaled measure of vacant port storage space;

(iii) accepting the offered space if the scaled measure of vacant port storage space is greater than the total current credit; and (iv) refusing the offered space if the scaled measure of vacant port storage space is less than the total current credit.

13. The at least one program storage device of claim 12, wherein the scaling factor is set substantially equal to a reciprocal of a fractional portion of data that is received by the port per a unit of time that will remain in the storage device of the port for a period exceeding the unit of time due to the difference between the first bandwidth and the second bandwidth.

14. The at least one program storage device of claim 13, wherein said method further comprises:

allocating, by a port credit manager, the offered space to at least one virtual lane of the port based on a space need of the at least one virtual lane if the offered space is accepted as a result of the determining.

15. The at least one program storage device of claim 12, wherein:

said method further comprises reckoning amounts of unused space remaining in space allocations in the central queue allotted to virtual lanes of the port, wherein an amount of unused space remaining in a space allocation in the central queue allotted to a virtual lane of the port comprises an amount allotted to the virtual lane, but currently not used to store a received data packet; and said computing further comprises summing the amounts of unused space remaining in space allocations in the central queue allotted to the virtual lanes of the port.

16. The at least one program storage device of claim 11, wherein said actively managing further comprises:

returning the offered space back to the central queue as returned space if said determining results in a refusal of the offered space; and adding the returned space to the amount of currently unused space in the central queue.

17. The at least one program storage device of claim 16, wherein:

the returned space includes vacated allocated space in the central queue that is currently assigned to a virtual lane of the port; and said actively managing further comprises deducting, from a current space debt of the virtual lane, an amount representing the vacated allocated space included in the returned space, wherein the current space debt of the virtual lane comprises an amount of space by which a space allocation in the central queue allotted to the virtual lane exceeds a target allocation.

* * * * *